April 3, 1934.  M. VIAS  1,953,378
ROTARY MOTOR
Filed July 12, 1933  2 Sheets-Sheet 1

INVENTOR.
Matthias Vias.
BY Townsend and Loftus.
ATTORNEYS.

April 3, 1934.  M. VIAS  1,953,378

ROTARY MOTOR

Filed July 12, 1933  2 Sheets-Sheet 2

INVENTOR.
Matthias Vias
BY Townsend and Loftus
ATTORNEYS.

Patented Apr. 3, 1934

1,953,378

UNITED STATES PATENT OFFICE 1,953,378

ROTARY MOTOR

Matthias Vias, San Francisco, Calif.

Application July 12, 1933, Serial No. 680,061

4 Claims. (Cl. 121—84)

This invention relates to rotary motors.

It is the principal object of the present invention to provide an improved rotary motor utilizing compressed air or steam as a motive fluid, which motor is smooth and efficient in operation, and capable of being maintained properly lubricated.

In practising the invention I provide a motor, a casing inclosing two cylinders, in each of which an eccentric rotor is disposed. These rotors are secured on a common shaft and are fitted with radial vanes against which motive fluid is caused to act to impart rotation to the rotors. The cylinders are fitted with inlet ports for the motive fluid, the exhaust thereof being through the vanes to an exhaust chamber in each rotor and thence through the casing to the atmosphere.

One form which the invention may assume is exemplified in the following description and illustrated by way of example in the accompanying drawings in which.

Figure 1:
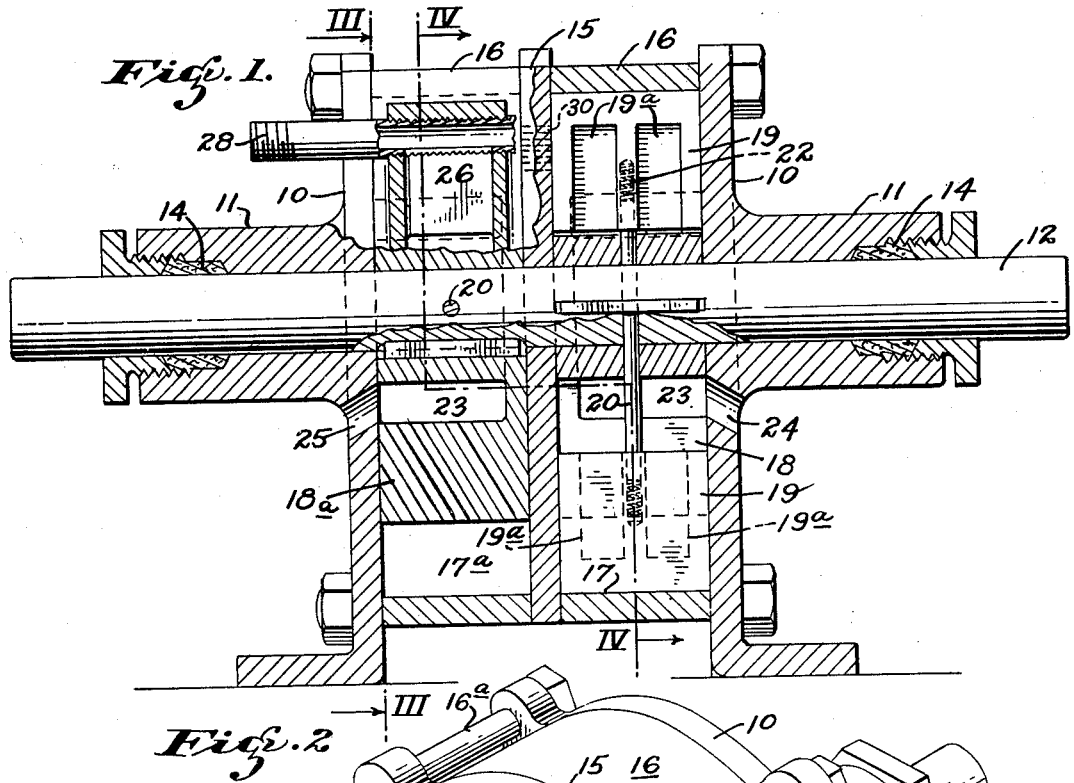
Fig. 1 is a central longitudinal section through the motor embodying my invention.

Referring more particularly to the accompanying drawings, I have illustrated a rotary motor which may utilize compressed air or steam as a motive fluid.

The rotary motor includes a casing formed of a pair of oppositely disposed head members 10, each fitted with a bearing 11 in which a shaft 12 is journalled. Packing glands 14 are fitted to the bearings 11 to prevent the escape of motive fluid along the shaft 12. The head members 10 are spaced apart, and disposed midway between the head members is a center head member 15, which is centrally bored in alignment with the bearings 11 to receive the shaft 12.

Figure 2:
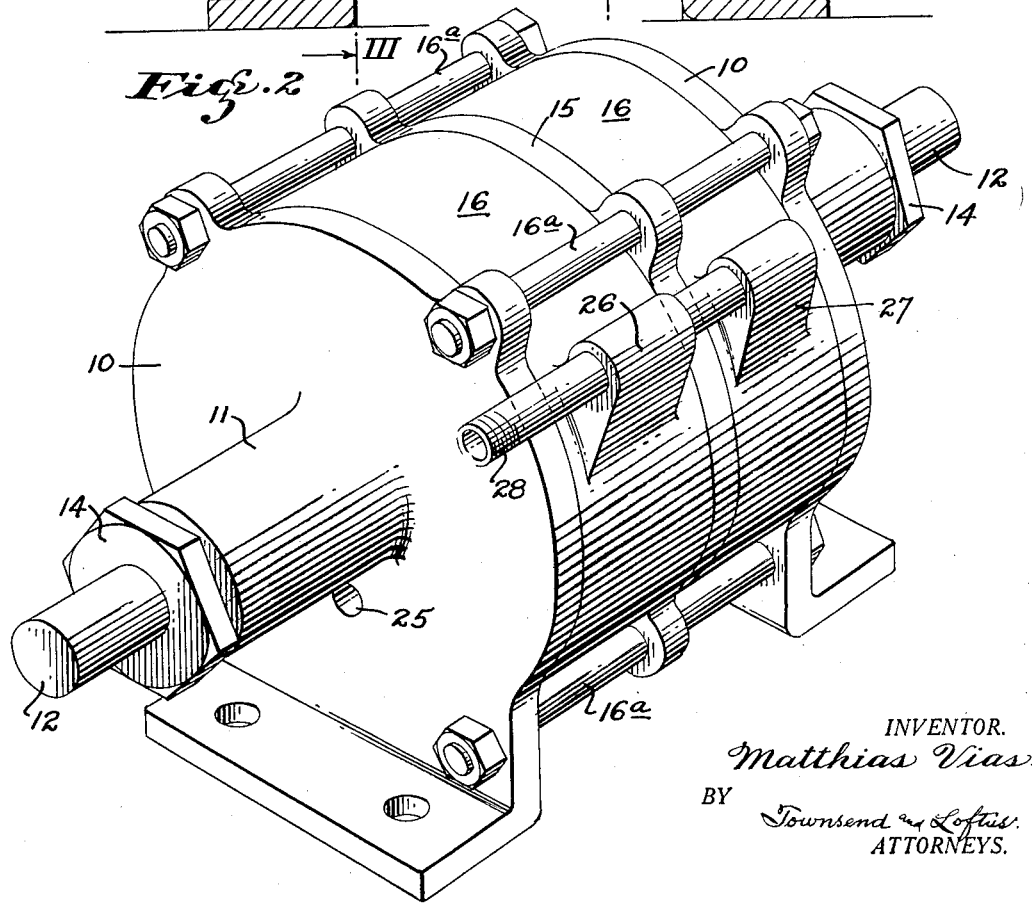
Fig. 2 is a perspective view of the same.
Figure 3:
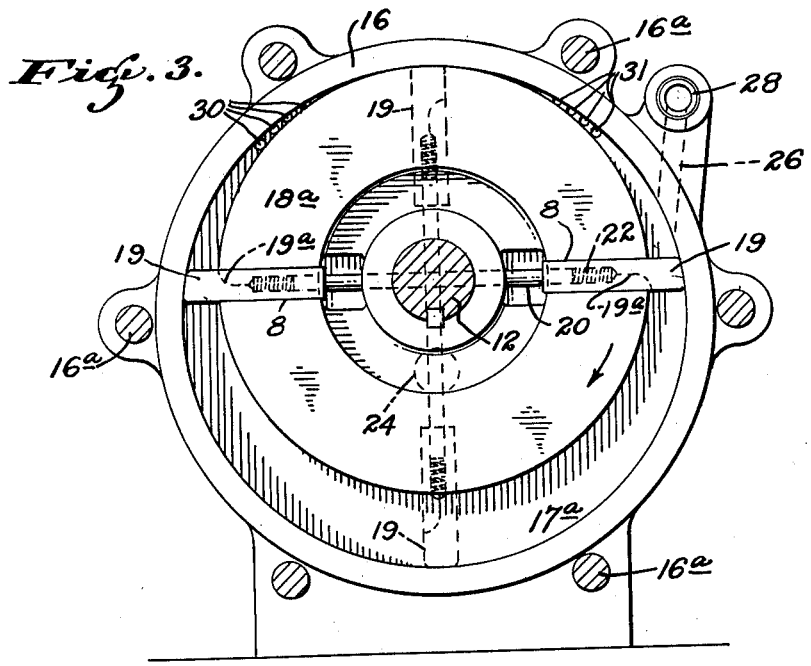
Fig. 3 is a sectional view through the motor taken on line III—III of Fig. 1.

Arranged between the central head member 15 and the end head members 10 are a pair of cylindrical members 16. The end head members 10, the center head member 15, and the members 16 are rigidly secured together by means of bolts 16a, as illustrated most clearly in Fig. 2. The members 16 are bored to form cylinders 17 and 17a, which are eccentric relative to the shaft 12.

Secured on the shaft 12 is a pair of rotors 18 and 18a, one being disposed in each cylinder 17 and 17a. These rotors 18 and 18a are of a diameter that will contact the cylinder walls at one point therein. The rotors are the same in axial dimension as the cylinders.

The rotor 18 is formed with a pair of radial slots 8 which are disposed at 180 degrees apart. The rotor 18a is likewise formed with a pair of radial slots 8 which are disposed at 180 degrees apart but the slots 8 of the two rotors are arranged relatively 90 degrees apart for the purpose which will be hereinafter described.

Figure 4:
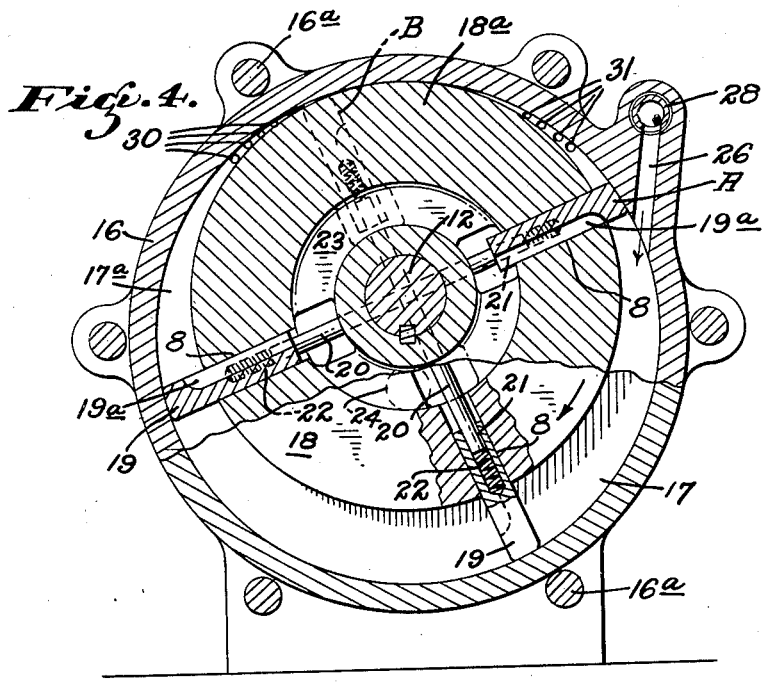
Fig. 4 is a sectional view through the motor taken on line IV—IV of Fig. 1.

Reference being had to Fig. 4, it will be noticed that a vane 19 is slidably disposed in each of the radial slots 8 of the rotors. The outer ends of these vanes are adapted to engage the wall of the cylinder in which it is mounted. For the purpose of maintaining this engagement I have provided each rotor with a diametrically arranged pin 20, which extends between opposed vanes 19 and projects in bores 21 at the inner end of the vanes. Between the ends of the pin 20 and the outer ends of the bores 21 are expansion springs 22 which tend to constantly maintain the vanes in engagement with the periphery of the chamber. It should be stated that the pin 20 of each rotor is reciprocably mounted in the rotor and in the shaft 12.

Each rotor is formed with a circular exhaust chamber 23 which extends inwardly from the outer face of the rotor to a point short of the inner face of the rotor. This exhaust chamber 23 communicates at 23 with the radial slots in which the vanes 19 are radially reciprocable.

One face of each vane is formed with two passageways 19a, which commence at a point short of the outer end of the vane, but which extend to the opposite or inner end of the vane, so that when the vanes are extended a predetermined amount from the outer face of the rotor these passageways will form a communication between the cylinder 12 and the exhaust chamber 23 of the rotor.

The end head members 10 are formed with exhaust ports 24 and 25, and with intake ports 26 and 27. The intake ports 26 and 27 are connected with a common delivery conduit 28 which is connected with the source of motive fluid. The exhaust ports 24 and 25, however, merely discharge the exhaust fluid into the atmosphere.

In operation of the motor, assuming that motive fluid is delivered to the pipe 28, it will pass through this pipe to the intake ports 26 and 27, which are located at the same point in the periphery of the chambers. These ports are tangentially arranged as illustrated.

Reference being had to Fig. 4 and assuming that the rotor is to be revolved in a clockwise direction, the moment the vane indicated by the letter "A" passes the intake port 26, the incoming motive fluid will exert its pressure against the rear face of the vane "B", forcing the same in a clockwise direction imparting rotation to the rotor and shaft 12. After the shaft 12 is at 90 degrees the vane "B" will be in a position where the incoming motive fluid from intake port 27 will impinge thereagainst and impart rotation to the shaft 12 through the rotor 18, both rotors 18 and 18a being, of course, keyed to the shaft 12.

Thus, it will be seen that as the vanes pass the intake ports 26 and 27 that the motive fluid will act thereagainst and impart rotation through the rotors to the shaft 12. To exhaust the motive fluid after its period of expansion is terminated is the reason for the provision of the passageways 23 in one face of the vanes.

Reference being had to Fig. 4, it will be noticed that after the vanes have traversed approximately 90 degrees from the intake port that they are sufficiently extended to enable the fluid in advance of the blades to discharge through the passageways 19a, in the vanes, into the exhaust chambers 23 of the rotors, and thence outwardly through the exhaust ports 24 and 25.

The auxiliary sets of ports 30 and 31 are for the purpose of eliminating back pressure against the vanes and to enable entrapped motive fluid ahead of the vanes to escape to the opposite chamber. This escape incidently, however, assists in causing rotation of the opposite rotor.

I wish to point out that due to my novel manner of exhausting the motive fluid after the expansion period, the oil in the chamber 17 will not be permitted to escape, but will be maintained in the chamber 17 for purposes of lubricating the various parts.

I also wish to call attention to the simplicity of the motor herein described and the minimum number of moving parts therein. It is obvious, of course, that due to the fact that I obtain four impulses per revolution that very smooth and efficient operation of the motor will result.

While I have shown but two rotors and two chambers, it is obvious that any number of chambers 17 and rotors 18 may be employed by merely adding additional units along the shaft 12.

Having shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a motor of the character described, a casing having a cylinder formed therein, a shaft extending through the casing and eccentrically disposed with respect to the cylinder, a rotor mounted in the cylinder and secured on the shaft, the periphery of said rotor engaging the wall of the cylinder at one point, a plurality of radial vanes mounted for radial reciprocal movement in the rotor and resiliently urged radially outward into engagement with the wall of the cylinder, means for directing motive fluid into the cylinder, said rotor having an exhaust chamber formed therein adjacent its center, said casing having an exhaust port in communication with said exhaust chamber, and means for forming a communication between said exhaust chamber and the space between the periphery of the rotor and the cylinder wall after the vanes have been extended a predetermined amount.

2. In a motor of the character described, a casing having a cylinder formed therein, a shaft extending through the casing and eccentrically disposed with respect to the cylinder, a rotor mounted in the cylinder and secured on the shaft, the periphery of said rotor engaging the wall of the cylinder at one point, a plurality of radial vanes mounted for radial reciprocal movement in the rotor and resiliently urged radially outward into engagement with the wall of the cylinder, means for directing motive fluid into the cylinder, said rotor having an exhaust chamber formed therein adjacent its center, said casing having an exhaust port in communication with said exhaust chamber, passageways formed in one face of the vanes to establish communication between the space intermediate the periphery of the rotor and the cylinder wall when the vanes are extended from the rotor a predetermined amount.

3. A rotary motor of the character described comprising a casing having a cylinder formed therein, a shaft journalled in the casing and extending through the cylinder in eccentric relation to the cylinder, a rotor secured on the shaft and mounted in the cylinder and contacting the cylinder wall at one point therein, a pair of vanes carried by the rotor and extending radially at 180 degrees apart, said vanes being radially reciprocably mounted in the rotor, spring means constantly urging said vanes radially outward, said casing being provided with inlet means for directing motive fluid to the space between the periphery of the rotor and the wall of the cylinder, an exhaust chamber formed in the rotor about its center, said cylinder being formed with an exhaust port in constant communication with said exhaust chamber, and means for establishing communication between the periphery of the rotor and the cylinder and said exhaust chamber when said blades are extended from the rotor a predetermined amount.

4. A rotary motor of the character described comprising a casing having a cylinder formed therein, a shaft journalled in the casing and extending through the cylinder in eccentric relation to the cylinder, a rotor secured on the shaft and mounted in the cylinder and contacting the cylinder wall at one point therein, a pair of vanes carried by the rotor and extending radially at 180 degrees apart, said vanes being radially reciprocably mounted in the rotor, spring means constantly urging said vanes radially outward, said casing being provided with inlet means for directing motive fluid to the space between the periphery of the rotor and the wall of the cylinder, an exhaust chamber formed in the rotor about its center, said cylinder being formed with an exhaust port in constant communication with said exhaust chamber, one face of each vane being formed with a fluid conducting passageway in constant communication with said exhaust chamber and adapted to be placed in communication with the space between the periphery of the rotor and the cylinder when the vanes are extended from the rotor a predetermined amount.

MATTHIAS VIAS.